US007479261B2

(12) United States Patent
Bray et al.

(10) Patent No.: US 7,479,261 B2

(45) Date of Patent: Jan. 20, 2009

(54) METHOD OF SEPARATING AND PURIFYING CESIUM-131 FROM BARIUM NITRATE

(75) Inventors: Lane Allan Bray, Richland, WA (US); Garrett N Brown, Richland, WA (US)

(73) Assignee: IsoRay Medical, Inc., Richland, WA (US)

( * ) Notice: Subject to any disclaimer, the term of this patent is extended or adjusted under 35 U.S.C. 154(b) by 653 days.

(21) Appl. No.: 11/158,899

(22) Filed: Jun. 22, 2005

(65) Prior Publication Data

US 2006/0051269 A1 Mar. 9, 2006

Related U.S. Application Data

(60) Provisional application No. 60/672,584, filed on Apr. 19, 2005, provisional application No. 60/583,554, filed on Jun. 28, 2004.

(51) Int. Cl.
*C01D 17/00* (2006.01)

(52) U.S. Cl. .......................................... 423/2; 423/249

(58) Field of Classification Search ..................... 423/2, 423/249

See application file for complete search history.

(56) References Cited

U.S. PATENT DOCUMENTS

| | | | | |
|---|---|---|---|---|
| 1,753,287 | A | 4/1930 | Failla | |
| 3,351,049 | A | 11/1967 | Lawrence | 128/1.2 |
| 3,706,689 | A | 12/1972 | Haskins | 252/301.1 R |
| 4,323,055 | A | 4/1982 | Kubiatowicz | 128/1.2 |
| 4,702,228 | A | 10/1987 | Russell, Jr. et al. | 128/1.2 |
| 4,784,116 | A | 11/1988 | Russell, Jr. et al. | 128/1.2 |
| 4,891,165 | A | 1/1990 | Suthanthiran | 252/633 |
| 4,994,013 | A | 2/1991 | Suthanthiran et al. | 600/8 |
| 5,071,610 | A | 12/1991 | Hagen et al. | 264/120 |
| 5,163,896 | A | 11/1992 | Suthanthiran et al. | 600/8 |
| 5,342,283 | A | 8/1994 | Good | 600/8 |
| 5,368,736 | A | 11/1994 | Horwitz et al. | 210/635 |
| 5,405,309 | A | 4/1995 | Carden, Jr. | 600/3 |
| 5,512,256 | A | 4/1996 | Bray et al. | 423/2 |
| 5,591,420 | A | 1/1997 | Balmer | 423/700 |
| 5,683,345 | A | 11/1997 | Waksman et al. | 600/3 |
| 5,749,042 | A | 5/1998 | Bray et al. | 423/2 |
| 5,899,882 | A | 5/1999 | Waksman et al. | 604/96 |
| 6,060,036 | A | 5/2000 | Armini | 424/1.29 |
| 6,066,302 | A | 5/2000 | Bray | 423/2 |
| 6,099,457 | A | 8/2000 | Good | 600/8 |
| 6,099,458 | A | 8/2000 | Robertson | 600/8 |
| 6,139,749 | A | 10/2000 | Goken et al. | 210/651 |
| 6,306,074 | B1 | 10/2001 | Waksman et al. | 600/7 |
| 6,309,614 | B1 | 10/2001 | Horwitz et al. | 423/2 |
| 6,351,049 | B1 | 2/2002 | Chassoulier et al. | 310/90.5 |
| 6,403,916 | B1 | 6/2002 | Spooner et al. | 219/121.63 |
| 6,458,070 | B1 | 10/2002 | Waksman et al. | 600/3 |
| 6,471,632 | B1 | 10/2002 | Jahrmarkt et al. | 600/8 |
| 6,479,920 | B1 | 11/2002 | Lal et al. | 310/309 |
| 6,485,406 | B1 | 11/2002 | Ziegler et al. | 600/8 |
| 6,503,185 | B1 | 1/2003 | Waksman et al. | 600/3 |
| 6,554,756 | B1 | 4/2003 | Schaart | 600/3 |
| 6,589,502 | B1 | 7/2003 | Coniglione et al. | 424/1.25 |
| 6,608,277 | B2 | 8/2003 | Spooner et al. | 219/121.63 |
| 6,666,811 | B1 | 12/2003 | Good | 600/8 |
| 6,679,824 | B1 | 1/2004 | Reed et al. | 600/7 |
| 6,689,043 | B1 | 2/2004 | McIntire et al. | 600/1 |
| 6,730,013 | B1 | 5/2004 | Shank et al. | 600/7 |
| 6,749,554 | B1 | 6/2004 | Snow et al. | 600/3 |
| 6,821,242 | B1 | 11/2004 | Waksman et al. | 600/3 |
| 2002/0022781 | A1 | 2/2002 | McIntire et al. | 600/458 |
| 2002/0162828 | A1 | 11/2002 | Spooner et al. | 219/121.63 |
| 2003/0088146 | A1 | 5/2003 | Slater et al. | 600/8 |
| 2003/0092959 | A1 | 5/2003 | Slater et al. | 600/8 |
| 2003/0229259 | A1 | 12/2003 | Waksman et al. | 600/3 |
| 2004/0076579 | A1 | 4/2004 | Coniglione et al. | 424/1.11 |
| 2004/0097779 | A1 | 5/2004 | McIntire et al. | 600/1 |
| 2004/0192999 | A1 | 9/2004 | Waksman et al. | 600/4 |
| 2004/0236169 | A1 | 11/2004 | Slater et al. | 600/8 |
| 2004/0242953 | A1 | 12/2004 | Good | 600/7 |
| 2006/0018813 | A1 | 1/2006 | Bray | 423/11 |
| 2006/0024223 | A1 | 2/2006 | Bray et al. | 423/1 |
| 2006/0167332 | A1 | 7/2006 | Bray | 600/3 |

FOREIGN PATENT DOCUMENTS

| | | |
|---|---|---|
| JP | 01-254900 | 10/1989 |
| WO | WO 00/51136 | 8/2000 |
| WO | WO 01/80251 | 10/2001 |
| WO | WO 2004/053892 | 6/2004 |

OTHER PUBLICATIONS

Harper, P.V. et al., "Isotopes Decaying by Electron Capture: a New Modality in Brachytherapy," in *Proceedings of the International Conference on the Peaceful Uses of Atomic Energy*, Geneva Switzerland, 1958, pp. 417-422.

Kurath, D.E. et al., "Ion Exchange Removal of Cesium from Simulated and Actual Hanford Tanks 241-SY-101 and 241-SY-103," in *Proceedings of the International Topical Meeting on Nuclear and Hazardous Waste Management Spectrum '96*, Aug. 18-23, 1996, Seattle, Washington, American Nuclear Society, La Grange Park, IL, 1996, pp. 222-228.

Wike, J.S. et al., "Chemistry for Commercial Scale Production of Yttrium-90 for Medical Research," *International Journal of Radiation Applications and Instrumentation Part A*, 41(9): 861-865, 1990.

Armpilia, C.I. et al., "The Determination of Radiobiologically Optimized Half-lives for Radionuclides Used in Permanent Brachytherapy Implants," *Int. J. Radiation Oncology Biol. Phys.* 55(2): 378-385, 2003.

Malinin, A.B. et al., "Production of $^{131}$Cs Without a Carrier and Estimation of the Cross Section of the Reaction $^{131}$Cs (n,γ) $^{132}$Cs on Thermal Neutrons," *Soviet Radiochemistry 14*(6): 896-899, Nov.-Dec. 1972.

"Radiation protection—Sealed radioactive sources—Leakage test methods," International Standard ISO 9978, First Edition, Feb. 15, 1992.

(Continued)

*Primary Examiner*—Steven Bos

(74) *Attorney, Agent, or Firm*—Seed IP Law PLLC

(57) ABSTRACT

The present invention provides a method of separating and purifying Cesium-131 (Cs-131) from Barium (Ba). Uses of the Cs-131 purified by the method include cancer research and treatment, such as for the use in brachytherapy. Cs-131 is particularly useful in the treatment of faster growing tumors.

14 Claims, 5 Drawing Sheets

OTHER PUBLICATIONS

"Radiation protection—Sealed radioactive sources—General requirements and classification," International Standard ISO 2919, Second Edition, Feb. 15, 1992.

R. Braun et al., "Crystalline Silicotitanates—Novel Commercial Cesium Ion Exchangers," UOP, pp. 1-12, pre-Nov. 2003.

Heintz, B.H. et al., "Comparison of I-125 sources used for permanent interstitial implants," *Med. Phys. 28*(4): 671-682, Apr. 2001.

Henschke, U.K. et al., "Cesium-131 Seeds for Permanent Implants," *Radiology 85*(6): 1117-1119, Dec. 1965.

Korb, L.J. et al., "Modern Brachytherapy for Localized Prostate Cancers: The Northwest Hospital (Seattle) Experience," *Review in Urology 3*(1): 51-60, Winter 2001.

3M Empore™ Rad Disks Product Listing, 1998. Available at http://www.mmm.com/empore, downloaded Mar. 11, 2004.

Balmer, M.L. et al., "New Silicotitanate Waste Forms: Development and Characterization," Interfacial and Processing Sciences Annual Report 1999. Available at http://www.pni.gov/microcats/aboutus/publications/microsystems/annual_report1999. Downloaded Sep. 19, 2004.

Hobbs, D.T., "Strategic Design and Optimization of Inorganic Sorberts for Cesium, Strontium, and Actinides," Westinghouse Savannah River Company Report WSRC-RP-2002-00337. Available at http://www.osti.gov/bridge. Downloaded Oct. 5, 2005.

Cary, A., "PNNL gel may charge drug obstacles," *Tri-City Herald*, Mar. 30, 2001. Available at http://www.tri-cityherald.com. Downloaded Oct. 8, 2004.

Hodgman, C.D. (ed.), "*Handbook of Chemistry and Physics, 31st edition*," Chemical Rubber Publishing Co., Cleveland, OH, pp. 408-409, 1949.

Hodgman, C.D. (ed.), "*Handbook of Chemistry and Physics, 31st edition*," Chemical Rubber Publishing Co., Cleveland, OH, pp. 524-525, 1949.

Kraus and Nelson, "Anion Exchange Studies of the Fission Products," in *Proc. Int. Conf. Peaceful Uses of Atomic Energy*, vol. 7, Geneve, 1955, pp. 113-125.

Naumann, R.A. et al., "Preparation of Radioactive Targets for Charged-Particle Nuclear Spectroscopy at the CERN-ISOLDE Project," *Nuclear Instruments and Methods in Physics Research B26*: 59-64, 1987.

pSiVida Company, BioSilicon internet web pages. Available at http://www.psivida.com.au/text. Downloaded Nov. 3, 2004.

Smith, L.L. et al., "Application of Empore™ Strontium Rad Disks to the Analysis of Radiostrontium in Environmental Water Samples," *Radiochemica Acts 73*:165-170, 1996.

Willard and Goodspeed, "Separation of Strontium, Barium, and Lead from Calcium and Other Metals," *Industrial and Engineering Chemistry 8*(6):414-418, 1936.

Reactor Generation of Ba-131 and Cs-131 In-Growth

Simulated "Milking" of Ba-131 Target

Figure 3:
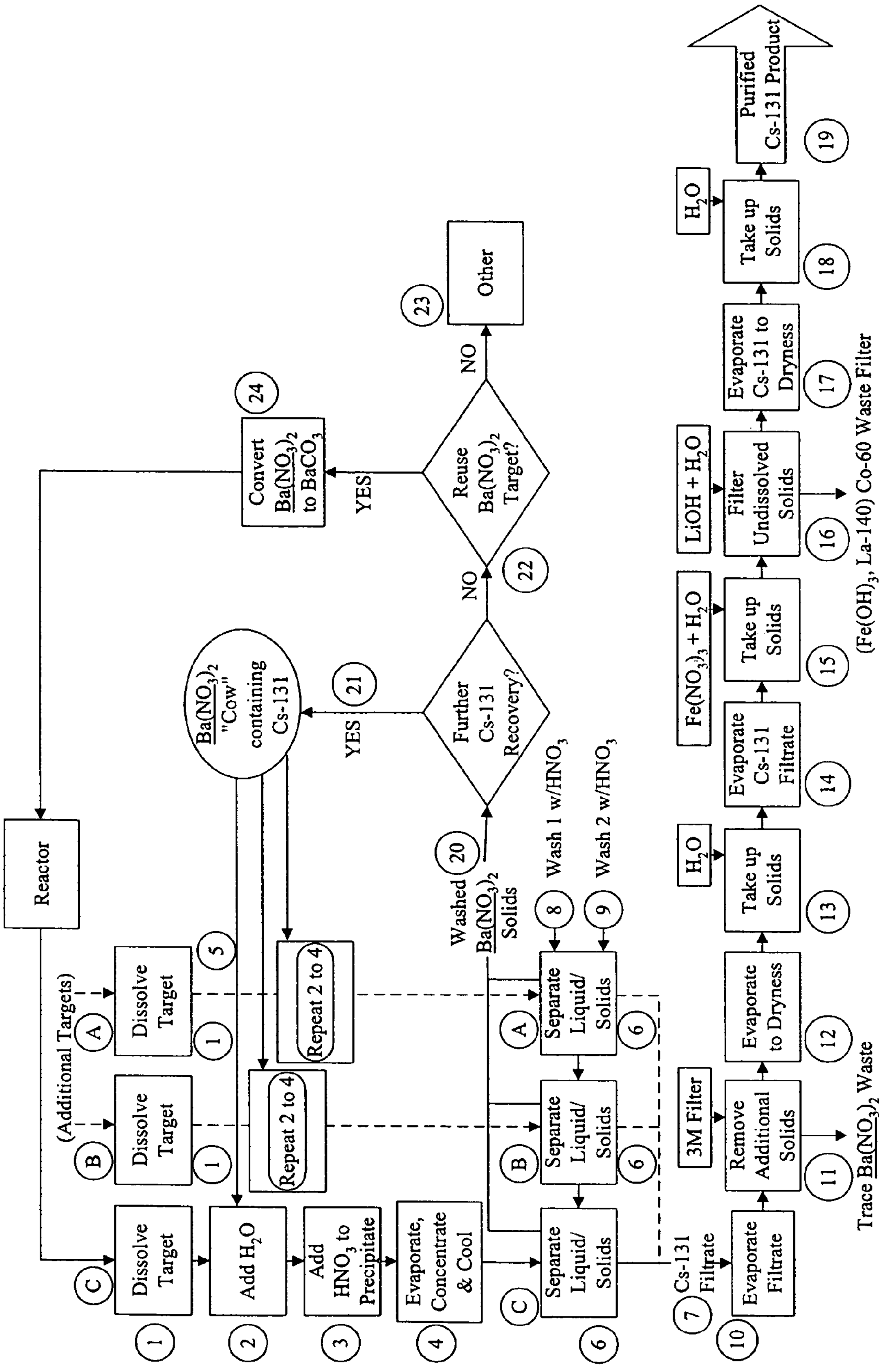

*Fig. 3* Cs/Ba Nitrate Separations Process Flow Diagram

Fractional Recovery of Ba and Cs in Nitric Acid

Concentration (μg/mL) of Ba and Cs in Nitric Acid

METHOD OF SEPARATING AND PURIFYING CESIUM-131 FROM BARIUM NITRATE

CROSS-REFERENCES TO RELATED APPLICATIONS

This application claims the benefit under 35 U.S.C. § 119 (e) of U.S. Provisional Patent Application No. 60/583,554 filed Jun. 28, 2004 and U.S. Provisional Patent Application No. 60/672,584 filed Apr. 19, 2005, where these two provisional applications are incorporated herein by reference in their entirety.

BACKGROUND OF THE INVENTION

1. Field of the Invention

The present invention relates generally to a method of separating Cesium-131 (Cs-131) from Barium (Ba). Uses of the Cs-131 purified by the method include cancer research and treatment, such as for use in brachytherapy implant seeds independent of method of fabrication.

2. Description of the Related Art

Radiation therapy (radiotherapy) refers to the treatment of diseases, including primarily the treatment of tumors such as cancer, with radiation. Radiotherapy is used to destroy malignant or unwanted tissue without causing excessive damage to the nearby healthy tissues.

Ionizing radiation can be used to selectively destroy cancerous cells contained within healthy tissue. Malignant cells are normally more sensitive to radiation than healthy cells. Therefore, by applying radiation of the correct amount over the ideal time period, it is possible to destroy all of the undesired cancer cells while saving or minimizing damage to the healthy tissue. For many decades, localized cancer has often been cured by the application of a carefully determined quantity of ionizing radiation during an appropriate period of time. Various methods have been developed for irradiating cancerous tissue while minimizing damage to the nearby healthy tissue. Such methods include the use of high-energy radiation beams from linear accelerators and other devices designed for use in external beam radiotherapy.

Another method of radiotherapy includes brachytherapy. Here, radioactive substances in the form of seeds, needles, wires or catheters are implanted permanently or temporarily directed into/near the cancerous tumor. Historically, radioactive materials used have included radon, radium and iridium-192. More recently, the radioactive isotopes cesium-131(Cs-131), iodine (I-125), and palladium (Pd-103) have been used. Examples are described in U.S. Pat. Nos. 3,351,049; 4,323,055; and 4,784,116.

During the last 30 years, numerous articles have been published on the use of I-125 and Pd-103 in treating slow growth prostate cancer. Despite the demonstrated success in certain regards of I-125 and Pd-103, there are certain disadvantages and limitations in their use. While the total dose can be controlled by the quantity and spacing of the seeds, the dose rate is set by the half-life of the radioisotope (60 days for I-125 and 17 days for Pd-103). For use in faster growing tumors, the radiation should be delivered to the cancerous cells at a faster, more uniform rate, while simultaneously preserving all of the advantages of using a soft x-ray emitting radioisotope. Such cancers are those found in the brain, lung, pancreas, prostate and other tissues.

Cesium-131 is a radionuclide product that is ideally suited for use in brachytherapy (cancer treatment using interstitial implants, i.e., "radioactive seeds"). The short half-life of Cs-131 makes the seeds effective against faster growing tumors such as those found in the brain, lung, and other sites (e.g., for prostate cancer).

Figure 1:
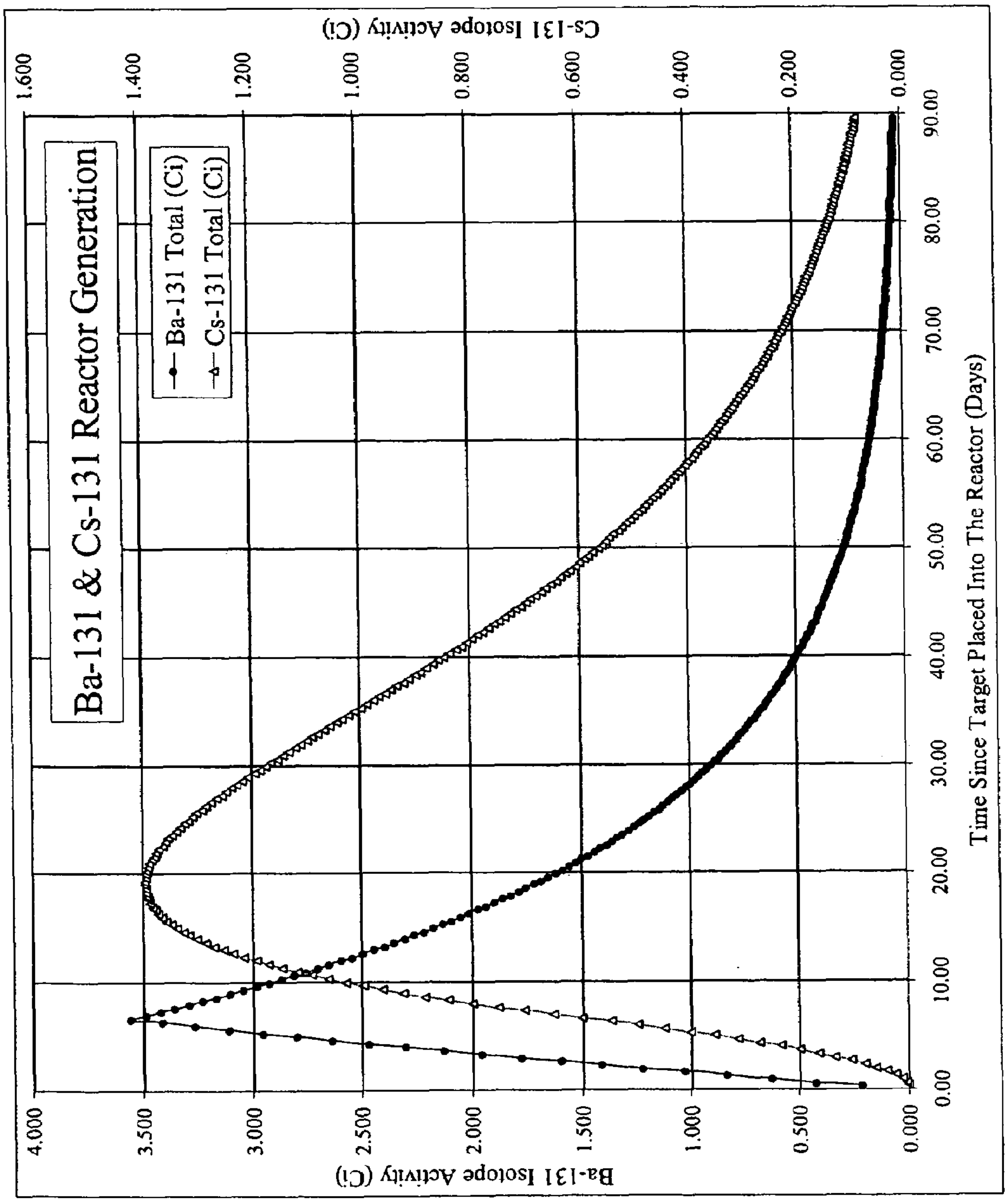
Figure 2:
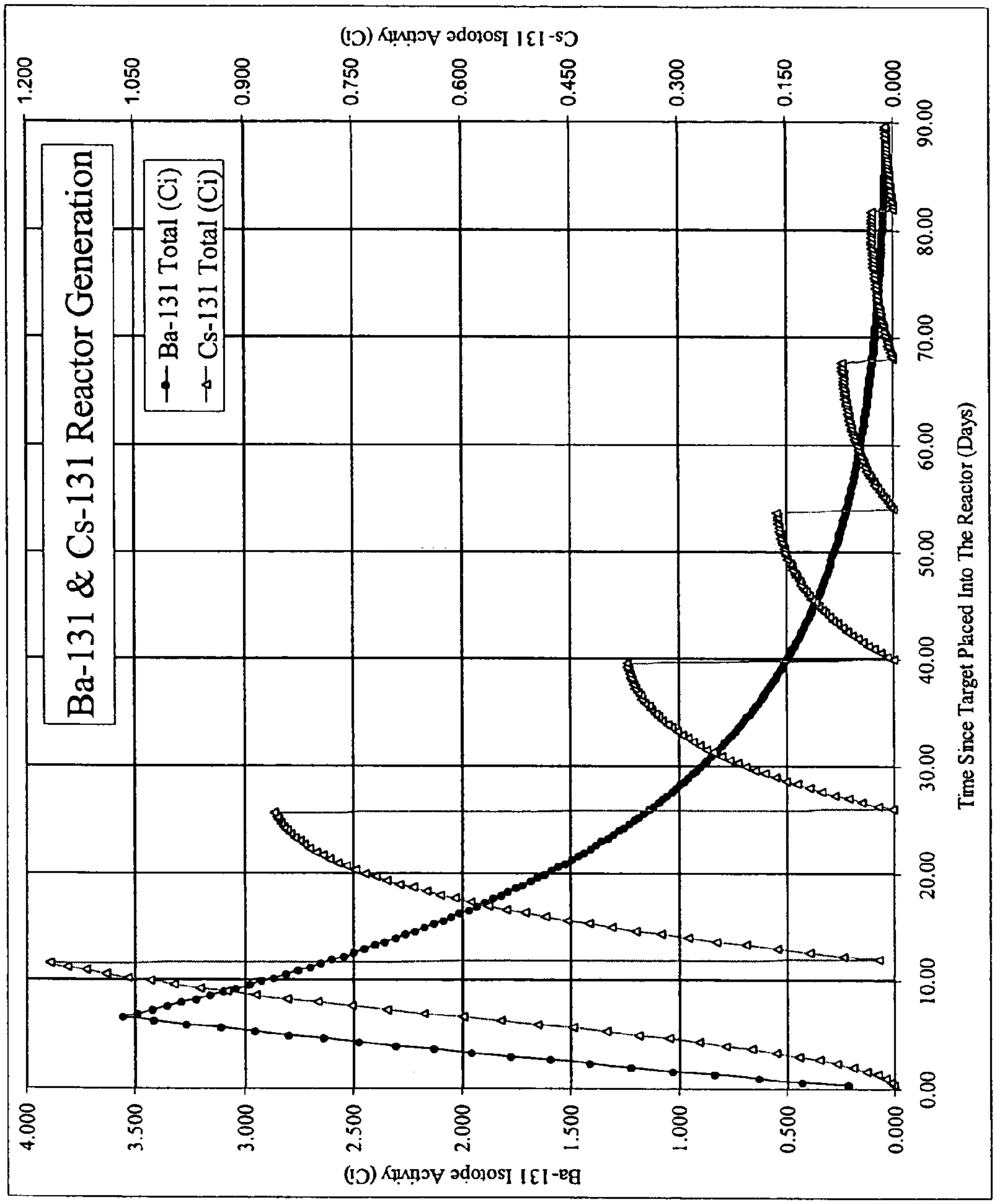

Cesium-131 is produced by radioactive decay from neutron irradiated naturally occurring Ba-130 (natural Ba comprises about 0.1% Ba-130) or from enriched barium containing additional Ba-130, which captures a neutron, becoming Ba-131. Ba-131 then decays with an 11.5-day half-life to cesium-131, which subsequently decays with a 9.7-day half-life to stable xenon-130. A representation of the in-growth of Ba-131 during 7-days in a typical reactor followed by decay after leaving the reactor is shown in FIG. 1. The buildup of Cs-131 with the decay of Ba-131 is also shown. To separate the Cs-131, the barium target is "milked" multiple times over selected intervals such as 7 to 14 days, as Ba-131 decays to Cs-131, as depicted in FIG. 2. With each "milking", the Curies of Cs-131 and gram ratio of Cs to Ba decreases (less Cs-131) until it is not economically of value to continue to "milk the cow" (as shown after ~40 days). The barium "target" can then be returned to the reactor for further irradiation (if sufficient Ba-130 is present) or discarded.

In order to be useful, the Cs-131 must be exceptionally pure, free from other metal (e.g., natural barium, calcium, iron, Ba-130, etc.) and radioactive ions including Ba-131. A typical radionuclide purity acceptance criterion for Cs-131 is >99.9% Cs-131 and <0.01% Ba-131.

The objective in producing highly purified Cs-131 from irradiated barium is to completely separate less than $7\times10^{-7}$ grams (0.7 μg) of Cs from each gram (1,000,000 μg) of barium "target". A typical target size may range from 30 to >600 grams of Ba(II), (natural Ba comprises about 0.1% Ba-130). Because Cs-131 is formed in the $BaCO_3$ crystal structure during decay of Ba-131, it is assumed that the Ba "target" must first be dissolved to release the very soluble Cs(I) ion.

Due to the need for highly purified Cs-131 and the deficiencies in the current approaches in the art, there is a need for improved methods.

BRIEF SUMMARY OF THE INVENTION

Briefly stated, the present invention discloses a method of producing and purifying Cs-131.

In one embodiment, the method for purifying Cs-131 comprises the steps of: (a) dissolving neutron-irradiated barium comprising barium and Cs-131, in a solution comprising an acid; (b) concentrating the solution to leave solution and solids; (c) contacting the solution and solids with a solution of 68-wt % to at least 90-wt % nitric acid, whereby Cs-131 is dissolved in the acid solution and barium is precipitated as a solid; and (d) separating the solids from the acid solution containing the Cs-131, thereby purifying the Cs-131. In another embodiment, steps (c) and (d) are repeated with the solids of step (d) and the acid solution from each step (d) is combined. In another embodiment, the acid solution of step (d) is evaporated to incipient dryness and steps (c) and (d) are repeated. In another embodiment, the solids of step (d) are subjected to the steps of: (i) storing the solids to allow additional Cs-131 to form from decay of barium; (ii) dissolving the solids in a solution comprising water, with heat; and (iii) repeating steps (b), (c) and (d). In another embodiment, the acid solution of step (d) containing the Cs-131 is subjected to step (e) comprising contacting the acid solution with a resin that removes barium. In another embodiment, the acid solution of step (d) or step (e) is subjected to an additional step comprising removing La-140 and Co-60 from the acid solution containing Cs-131. For any embodiment of the method, the solution containing the purified Cs-131 may be evaporated to incipient dryness and the purified Cs-131 dissolved with a solution of choice.

In one embodiment the method comprises the steps of dissolving irradiated Ba (e.g., irradiated Ba carbonate) comprised of natural or enriched Ba including Ba-130, Ba-131, and Cs-131 from the decay of Ba-131, in an acid and heated water solution, evaporating the solution with about 68-90-wt % (preferably about 85-90-wt %) $HNO_3$ to near incipient dryness, and separating the solids from the small volume of acid solution containing the Cs-131. If desired, the filtrate containing 100% of the Cs-131 and a trace of Ba can be passed through a 3M Empore™ "web" disc of Sr Rad or Ra Rad to remove the last traces of Ba. The resulting solution can then be evaporated to remove the acid from the Cs-131. Traces of La-140 (40-hr ½-life) resulting from the irradiation of Ba-138 and Co-60 (5.3-y ½-life) from impurities in the barium target material, are (where present) removed from the water solution by classical chemistry to provide a radiochemical "ultra-pure" Cesium-131 final product. The Ba is "remilked" as additional Cs-131 becomes available from the decay of Ba-131. When no longer viable, the Ba nitrate is converted back to Ba carbonate for further irradiation or storage.

These and other aspects of the present invention will become apparent upon reference to the following detailed description and attached drawings.

BRIEF DESCRIPTION OF THE SEVERAL VIEWS OF THE DRAWING(S)

FIG. 1, entitled "Reactor Generation of Ba-131 and Cs-131 In-Growth," is a diagram of the in-growth of Ba-131 during 7-days in a typical reactor followed by decay after leaving the reactor.

FIG. 2, entitled "Simulated 'Milking' of Ba-131 Target," is a diagram of the buildup of Cs-131 with the decay of Ba-131.

FIG. 3, entitled "Cs/Ba Separations Process Flow Diagram," is a process flow diagram depicting the preferred embodiment of the process steps.

Figure 4:
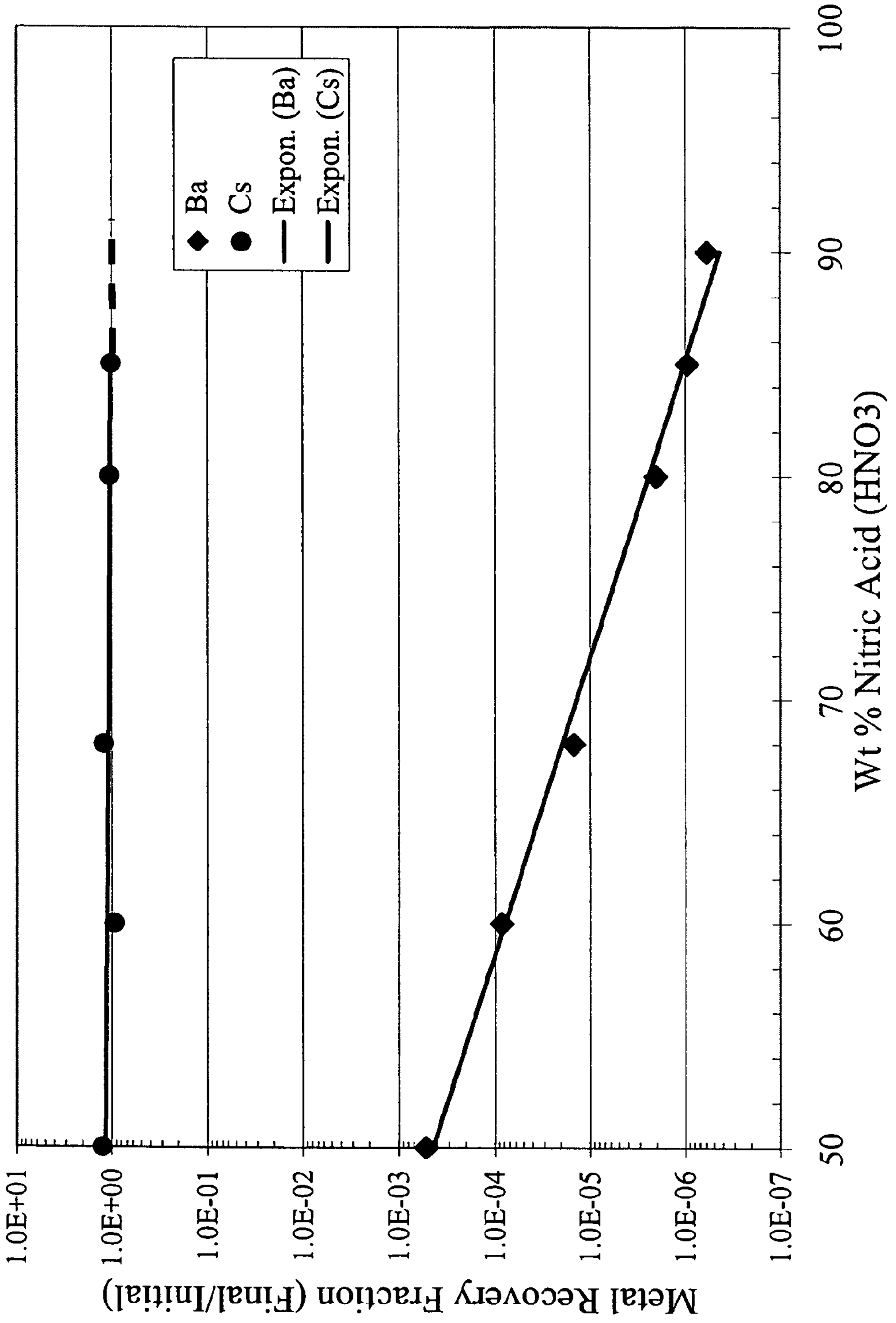

FIG. 4, entitled "Fractional Recovery of Ba and Cs in Nitric Acid," is a diagram of the fractional recovery of Cs and Ba as a function of the Wt % of the nitric acid concentration.

Figure 5:
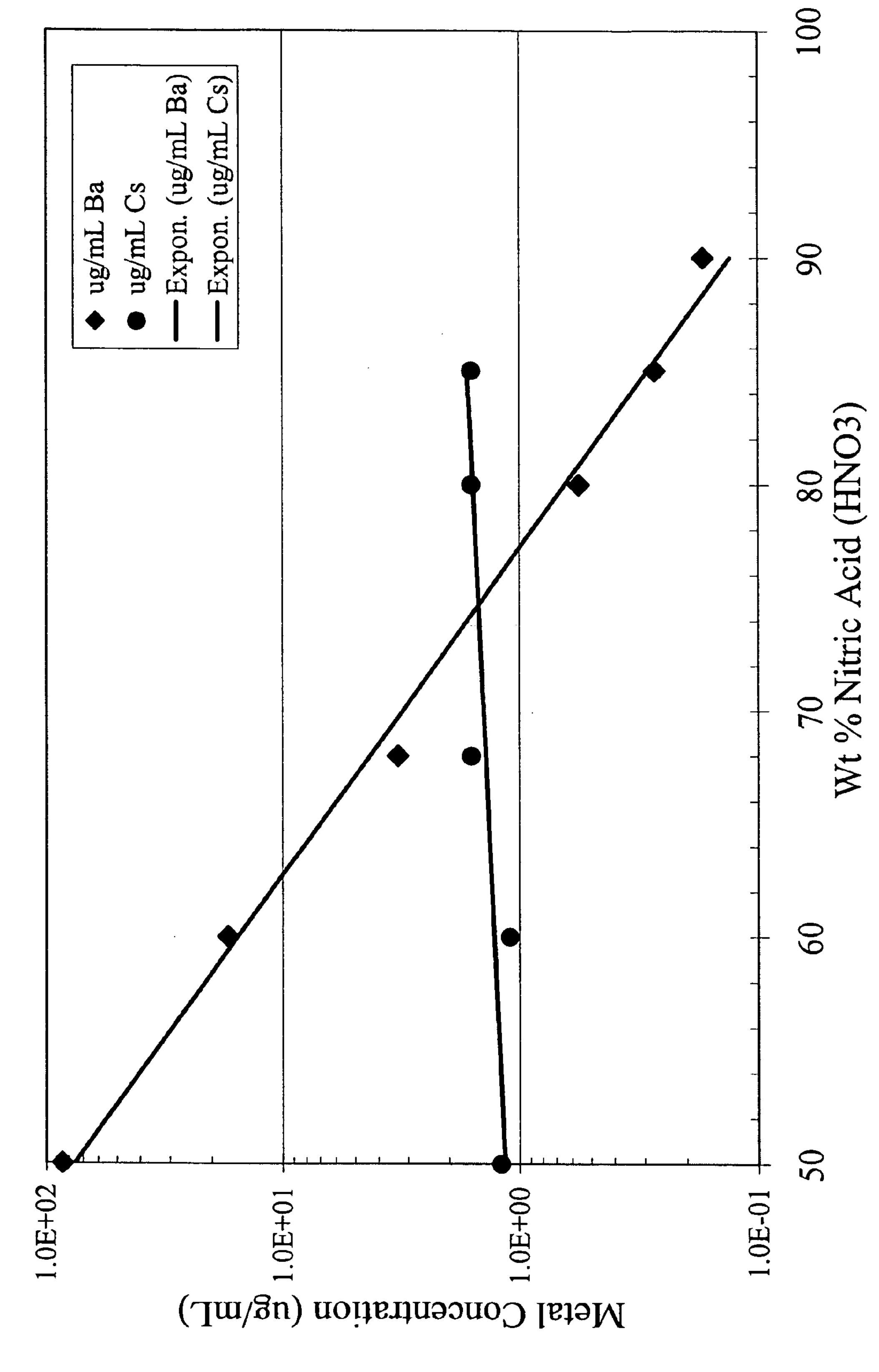

FIG. 5, entitled "Concentration (μg/mL) of Ba and Cs in Nitric Acid," is a diagram of the Cs and Ba mass solubility (μg/mL) as a function of the Wt % of the nitric acid concentration.

DETAILED DESCRIPTION OF THE INVENTION

The present invention provides a method of separating and purifying Cs-131 from barium nitrate. The method is efficient and economical. In a particularly preferred embodiment, the trace of Ba (if present) is removed. Cs-131 preparations of purity heretofore unavailable are produced.

The Ba target for neutron-irradiation may be in a variety of forms of Ba. Preferred forms are Ba salts. Examples of suitable Ba salts are $BaCO_3$ and $BaSO_4$. Other potentially possible forms are BaO or Ba metal, provided they are used in a target capsule that is sealed from water or air.

As shown by the disclosure herein, nitric acid concentrations from about 68-wt % to at least about 90-wt % are useful to separate and purify Cs-131 from Ba, including Ba-130 and Ba-131. Further surprisingly the solubility of Ba continues to decrease as the concentration of nitric acid continues to increase to about 90-wt %, rather than the minimum solubility of Ba being reached at a lower concentration of nitric acid. In the context of the method of the present invention, a concentration of nitric acid in the range typically from about 68-wt % to about 90-wt % may be used, with a range of about 85-90-wt % being preferred. In an embodiment, the concentration of the nitric acid is at least 90-wt %. Any ranges disclosed herein include all whole integer ranges thereof (e.g., 85-90-wt % includes 85-89-wt %, 86-90-wt %, 86-89-wt %, etc.).

It may be desirable to augment the method of the present invention to remove a trace of Ba if present in order to purify and convert the Cs-131 into a radiochemically "ultra pure" final product. One of ordinary skill in the art of traditional ion exchange column methods will recognize that a number of organic resins have the potential to remove the trace of unwanted Ba from the Cs-131 product. IBC SuperLig® 620, Eichrom Sr Resin®, Eichrom Ln Resin® and Eichrom TRU Resin® are a few examples.

Alternatively, the 3M Empore™ Sr Rad or Radium Rad discs are uniquely suitable for removal of trace Ba and useful for a preferred embodiment of this invention. The discs are prepared and sold by 3M, St. Paul, Minn., and consist of a paper thin membrane containing cation exchange resin incorporated into a disc or cartridge, and can be designed to be placed on a syringe barrel. The 3M Empore™ extraction discs for the removal of trace Ba are an effective alternative to conventional radiochemical sample preparation methods that use wet chemistry or packed columns.

The exchange absorbing resin is ground to a very fine high-surface area powder and "is secured in a thin membrane as densely packed, element-selective particles held in a stable inert matrix of PTFE (polytrifluoroethylene) fibrils that separate, collect and concentrate the target radioisotope on the surface of the disc", in accordance with the method described in U.S. Pat. No. 5,071,610. The 3M Empore™ Sr Rad and Ra Rad discs are commercially sold for the quantitative determination of radio strontium (Sr) or radium (Ra) in aqueous solutions. As shown below, the Radium Rad and Strontium Rad discs work equally well for Ba.

In general, the solution containing the unwanted ion is passed through the paper thin extraction disc by placing the solution in a syringe barrel and forcing the solution through the disc with a plunger. The method takes from 10 seconds to 1 minute to complete. A second method is to place the extraction disc on a fritted or porous filter and forcing the solution through the disc by vacuum. The method is very fast and requires no ion exchange column system.

In addition, it may be desirable to augment the method of the present invention to remove traces of radiochemicals such as Cobalt-60 or Lanthanium-140. La-140 (40-hr ½-life) results from the irradiation of Ba-138 and Co-60 (5.26-y½-life) from impurities in the barium target material. One of ordinary skill in the art of traditional ion exchange or carrier-precipitation methods will recognize that a number of organic resins mentioned above or classical chemical metal hydroxide methods have the potential to remove the trace of unwanted Co-60 and La-140 from the water solution to provide a radiochemical "ultra-pure" Cesium-131 final product.

After the Cs-131 is separated from the Ba, the residual Ba nitrate "target" is stored to allow in-growth of additional Cs-131 in the crystal structure of the Ba nitrate solid, from the decay of Ba-131. To "milk" additional Cs-131 from the "target" or "cow," the Ba nitrate solid is dissolved in water to release the Cs-131. The "Handbook of Chemistry and Physics", 31st edition, 1949, lists the solubility of $Ba(NO_3)_2$ as "34.2 g/100 mL $H_2O$ @ 100° C. and 8.7 g/100 mL $H_2O$ @ 20° C." Experimental tests have verified these solubility values.

As described above, Cs-131 is useful for radiotherapy (such as to treat malignancies). Where it is desired to implant a radioactive substance (e.g., Cs-131) into/near a tumor for therapy (brachytherapy), Cs-131 may be used as part of the fabrication of brachytherapy implant substance (e.g., seed). The method of the present invention provides purified Cs-131 for these and other uses.

DETAILED DESCRIPTION OF CERTAIN PREFERRED EMBODIMENTS

In accordance with preferred aspects of the invention, a preferred embodiment of the method of separation and purification of Cs-131 is described with reference to FIG. 3. A single target (C) may vary in weight depending on target available and equipment size (a typical target may range from 30 to >600 grams). Multiple targets (3 to >10) are represented by (C) just out of the reactor, (B) a target being milked for the second time, and (A) a target that has been milked several times. It comprises the steps of 1 dissolving a quantity of neutron-irradiated $\underline{BaCO_3}$ salt target in a stoichiometric amount of nitric acid $\overline{(HNO_3)}$ and a sufficient amount of water 2 to bring the $\underline{Ba(NO_3)_2}$ salt into solution at ~100° C. This target is comprised of natural or enriched Ba, Ba-131 and Cs-131 formed by radioactive decay of Ba-131 (a typical irradiation of natural Ba yields approximately $7\times10^{-7}$ gram Cs per gram Ba). The specific activity of Cs-131 is about $1\times10^5$ Curies per gram of cesium. The acid reaction thereby releases the cesium nitrate [Cs-131]$NO_3$ from the Ba salt and produces a solution comprising barium nitrate $Ba(NO_3)_2$, $CsNO_3$, water ($H_2O$) and carbon dioxide gas ($CO_2$). Besides $BaCO_3$, any other target salt could be used that would be recognized by one of ordinary skill in the art, including barium oxide (BaO), barium sulfate ($BaSO_4$), barium nitrate ($Ba(NO_3)_2$), and barium metal. However, the carbonate form is stable to neutron irradiation.

The use of nitric acid to dissolve the $\underline{BaCO_3}$ was selected to obtain a solution that was compatible with subsequent steps. However, one of ordinary skill in the art in possession of the present disclosure will recognize that other organic or inorganic acids may be used. Ba(II) has a limited solubility in an excess of most mineral acids, e.g., HCl, $H_2SO_4$. This includes $HNO_3$ and this limited solubility is a basis for the detailed description of the preferred embodiments below. The dissolution reaction is represented by the following equation:

$$\underline{BaCO_3}+\underline{Cs_2CO_3}+4HNO_3\rightarrow Ba(NO_3)_2+2CO_2\uparrow+2H_2O+2CsNO_3.$$

Because of the limited solubility of $\underline{Ba(NO_3)_3}$, the reaction is carried out in excess water with heat.

The resulting dissolved nitrate solution is concentrated to remove excess $H_2O$. The resulting solution and solids are adjusted with a sufficient amount of 68-90-wt % $HNO_3$, with stirring or other means of agitation 3, and brought to near dryness with heat 4. The resulting small volume of nitric acid solution containing the soluble [Cs-131 nitrate] fraction is cooled to 25° C. and separated 6 from the bulk of the insoluble $\underline{Ba(NO_3)_2}$ precipitated salt 6 by filtration or centrifugation as $\overline{\text{Cs-131 filtrate}}$ 7. If other previously dissolved targets 5 are also being processed, steps 2, 3, 4 and 6 will be completed. Two or more 68-90-wt % $HNO_3$ washes 8, 9 of the insoluble $\underline{Ba(NO_3)_2}$ salt are used in cascade (A to B, to C, to the Cs-131 $\overline{\text{filtrate}}$) to remove the interstitial solution and increase the overall recovery of Cs-131. The nitric acid filtrate and wash containing the Cs-131 is sampled 7 to determine the initial purity of the Cs-131 product.

The Cs-131 product sample still containing unwanted small fraction of Ba(II) is evaporated 10 to a small volume (5-15 mL) to remove the excess nitric acid.

The 90-wt % $HNO_3$ precipitation reaction is represented by the following equation:

$$90\text{-wt }\%\ HNO_3+Ba(NO_3)_2+CsNO_3\rightarrow\underline{Ba(NO_3)_2}\ (\text{precipitated})+CsNO_3+HNO_3.$$

The $CsNO_3$ and trace Ba plus $HNO_3$ is diluted 15 to ~10 $\underline{M}NO_3$. The solution 10 is passed through 11 a 3M Empore™ Ra Rad or Sr Rad ion exchange membrane filter (3M Co.) to remove traces of Ba. The Cs-131 solution plus $HNO_3$ is evaporated 12 to incipient dryness to remove the remaining traces of nitric acid. The purified Cs-131 is dissolved 13 in water and evaporated a second time 14.

To remove unwanted Co-60 and La-140 still contaminating the Cs-131, the solids from 14 are dissolved in a water solution 15 containing $Fe(NO_3)_3$. The solution is then made basic (typically to a pH of greater than or equal to 9) with a solution containing LiOH. The solution is stirred to form a $Fe(OH)_3$ precipitate which also co-precipitates $La(OH)_3$ and $Co(OH)_{2-3}$. The solids are filtered 16 and the effluent containing Cs-131 is evaporated 17 to dryness. The "ultra-pure" Cs-131 is dissolved 18 in distilled water or as specified by the end user 20.

To complete additional "milkings" of the washed $\underline{Ba(NO_3)_2}$ solids 20, the "cow" 21 containing additional $\overline{\text{Cs-131}}$ from the decay of Ba-131 is dissolved in water 2 at 90-100° C., and 3 through 9 again repeated. When no further Cs-131 recovery is required or economical 22, the $\underline{Ba(NO_3)_2}$ is discharged to waste 23 or converted to $BaCO_3$ 24, and returned to the reactor.

The following Examples are offered by way of illustration and not by way of limitation.

EXAMPLES

Example 1

Solubility of Ba and Cs in Nitric Acid

A series of tests were completed to determine the solubility of Ba and Cs as a function of nitric acid concentration. The results of this study are shown in FIG. 4, and outlined below.

Approximately 5.30 grams (g) of $Ba(NO_3)_2$ (equivalent to 2.75 g Ba) and 20 micrograms (ug) of Cs(I) (equivalent to 2 Ci Cs-131) was contacted with 10 milliliter (mL) of 50 to 90-wt % $HNO_3$ for various contact times and temperatures. The solids and solution were filtered and the resulting filtrate analyzed for Ba and Cs. FIG. 4 shows the fractional recovery (final/initial) for both Cs and Ba. From the Figure it is readily apparent that Cs remains completely in solution (final/initial ~1.0) at all $HNO_3$ acid concentrations evaluated. Conversely, the fractional recovery (final/initial) of Ba(II) in solution varies from $4.7\times10^{-4}$ at 50-wt % to $5.7\times10^{-7}$ at 90-wt % acid. Combining the results from FIG. 4 and the simulated reactor production of Ba-131 and Cs-131 from FIG. 2, the first "milking" will contain ~1 Ci Cs-131 and $3\times10^{-6}$ Ci Ba-131 when 85-wt % acid is used. This Ba-131 level is more than 30 times lower than required for typical purity specifications. Since the half-lives of both radioisotopes are approximately the same, subsequent milkings will have nearly the same ratio of Cs-131/Ba-131.

The Ba and Cs values found above in the aqueous filtrate were plotted as a function of their metal concentration in micrograms (μg) found per milliliter (mL) of filtrate, FIG. 5. The results show that under the test conditions at less than 75-wt % acid the Ba concentration (μg/mL) in solution is greater than Cs (μg/mL). The two metal concentrations (μg/mL) are approximately equal at ~75-wt % acid. At higher acid strength the Ba is less than Cs. At 90-wt %, the Cs metal value is 10-times that of the Ba metal value. Contact times from 10 minutes to 2-hrs gave similar results.

EXAMPLE 2

Removal of Trace Ba

3M Empore™ Test Conditions:

1. Make up 4 mL of 10 M $HNO_3$ solution containing 80λ each of 1000 μg Ba/mL, and 1000 μg Cs/mL. Take a Sr Rad disc (3M Co.). Precondition with 10M $HNO_3$. Pass 1 mL of Ba solution through the disc. Pass 1 mL of 10M $HNO_3$ through the disc as a rinse. Analyze 2 mL of the standard solution and 2 mL of the effluent for Ba and Cs.

2. Make up 5 mL of 10M $HNO_3$ solution containing 100λ each of 1000 μg Ba/mL and 1000 μg Cs/mL. Take a Ra Rad disc (3M Co.). Precondition with 10M $HNO_3$. Pass 1 mL of Ba solution through the disc. Pass 1 mL of 10M $HNO_3$ through the disc as a rinse. Analyze 2 mL of the standard solution and 2 mL of the effluent for Ba and Cs.

TABLE 1

| Analytical Laboratory Results | | |
|---|---|---|
| 1. 10M $HNO_3$ Standard | Sr Rad Disc | Fractional Recovery |
| Ba, 30 μg/mL | 0.38 μg/mL | 0.013 |
| Cs, 20 | 22 | 1 |
| 2. 10M $HNO_3$ Standard | Ra Rad Disc | Fractional Recovery* |
| Ba, 30 μg/mL | 0.44 μg/mL | 0.015 |
| Cs, 20 | 24 | 1 |

*FR = Final/Initial, Fractional Recovery

The above results show that the Sr Rad Disc and the Ra Rad Disc are equally effective in recovery of Ba (Fractional Recovery=0.015).

EXAMPLE 3

La-140/Co-60 Isolation from Cesium Nitrate Process

La/Co Trace Separation Process:

1. Take a 10-mL solution of 1.57 molar $HNO_3$ containing Cs-131, Co-60 and La-140 and place in a beaker.

2. Evaporate the solution to dryness to remove the acid. Re-suspend the resulting solids with 10-mL of $H_2O$ and again take to dryness with heat to assure elimination of the acid.

3. Add 5-mL of 0.04M $Fe(NO_3)_3$ solution to the beaker while stirring to dissolve any solids. Soak the solids for 5 minutes.

4. With stirring, add dropwise 5-mL of 0.16M LiOH solution to the beaker to precipitate the iron as $Fe(OH)_3$. $Li^+$ hydroxide was chosen because it provides the lowest interference with $Cs^+$ as compared to other ions ($Li<Na<K<Rb<NH_4$ ions).

5. Transfer the solution and solids with a small transfer pipette to a 25-mL syringe fitted with a 25-mm 0.45-μm filter. Filter the Cs-131 filtrate solution into a clean beaker.

6. Take the filtrate to dryness and re-suspend in 10-mL of $H_2O$. Analyze the resulting solution.

TABLE 2

| Analytical Laboratory Results | | | |
|---|---|---|---|
| Sample ID Isotope | Initial milliCuries/sample | Final milliCuries/sample | Decontamination Factor (Initial/Final) |
| Cs-131 | 1180 | 937 | 1.3 |
| La-140 | 1.97 | <0.0003 | >6567 |
| Co-60 | 0.0177 | 0.0002 | >88.5 |

7. Traces of La-140 (40-hr ½-life) resulting from the irradiation of Ba-138 and Co-60 (5.3-y ½-life) from impurities in the barium target material, are removed from a water solution of Cesium-131 by classical carrier precipitation chemistry to provide a radiochemical "ultra-pure" Cesium-131 final product.

8. One of ordinary skill in the art of traditional carrier precipitation and ion exchange will recognize that a number of metals other than iron can be used, e.g., lead, cerium, etc. Other base solutions such as $NH_4OH$, NaOH, or KOH can be used to precipitate the carrier. In addition, ion exchange methods have the potential to remove the trace of unwanted La-140 and Co-60. Eichrom Ln Resin® is but one example.

EXAMPLE 4

Process for the Separation of Barium from Cs-131

Cesium-131 Separation and Purification Process Campaign:

Processing of New Target E, two $2^{nd}$ cycle targets, A and B; and two $1^{st}$ cycle targets, C and D.

New Target (Target E)

1. $BaCO_3$ targets consisting of ~150 grams were processed.

2. Each "new" target was dissolved in a stoichiometric amount (100-mL) of 15.7 molar $HNO_3$.

3. After dissolution to the nitrate form, the nitrate salts were dissolved in 600 mL of $H_2O$ at 100° C.

4. After complete dissolution, each new nitrate target was evaporated to near dryness with 160 mL of $HNO_3$, to form a mixture of $Ba(NO_3)_2$ salts and $CsNO_3$in ~16 molar $HNO_3$ acid solution.

5. $CsNO_3$ contained in the $HNO_3$ solution was separated from the $Ba(NO_3)_2$ salt solids by filtration and combined as Cs Product solution. $2^{nd}$-$3^{rd}$ Cycle $Ba(NO_3)_2$(Targets D, C, B, and A)

6. Targets for "remilking" consisted of ~198.6 grams each of $Ba(NO_3)_2$

7. Each nitrate target was dissolved in 600-750 mL of $H_2O$ at 100° C.

8. After complete dissolution, each nitrate target was evaporated to near dryness with 160 mL of $HNO_3$, to form a mixture of $Ba(NO_3)_2$ salts and $CsNO_3$ in ~16 molar $HNO_3$ acid solution.

9. $CsNO_3$ contained in each of the $HNO_3$ solutions (D, C, B, and A) was separated from the $Ba(NO_3)_2$ salt solids by filtration and combined as Cs Product solution.

Solids Wash to Recover Interstitial $CsNO_3$

10. $Ba(NO_3)_2$ filtered solids from the $3^{rd}$ cycle (Targets A and B) were washed in series (A to B to Cs Product bottle) twice with 80-mL volumes of 15.7 molar $HNO_3$ and the filtrate combined with (#5 and #9 above) in the Cs Product bottle.

11. $Ba(NO_3)_2$ filtered solids from the 2nd cycle (Targets C and D) and new Target E were washed in series (C to D to E to Cs Product bottle) twice with two 80-mL volumes of 15.7 molar $HNO_3$ and the filtrate combined with (#5, #9 and #10 above) in the Cs Product bottle.

12. The combined Cs-131 $HNO_3$ Product solution was Sampled (Sample #1). The solution was then evaporated by heating to 10-25-mL to reduce the volume and to concentrate the remaining trace of barium (which partially drops out of the acid solution due to its limited solubility, forming $Ba(NO_3)_2$.

13. The concentrated nitrate solution was filtered through a 3M® 47-mm Ra Rad Disc, removing any residual barium nitrate salts and trace $Ba^{2+}$ ions from solution.

14. The Cs-131 nitrate filtrate solution was taken to dryness to remove unwanted $HNO_3$.

15. The residual salts including Cs-131/Co-60/La-140 were taken up in 10-mL of $H_2O$ and again taken to dryness to remove any residual acid.

16. The solids were dissolved in 5-mL of 0.04 molar $Fe(NO_3)_3$ solution and mixed with 5-mL of 0.16 molar LiOH to form $Fe(OH)_3$ precipitate.

17. The Cs-131 containing solution and $Fe(OH)_3$ solids were separated using a 25-mL syringe fitted with a 25-mm 0.45-μm filter. The Cs-131 filtrate solution was taken to dryness with heat.

18. The Cs-131 radio chemically "ultra-pure" Product was brought into solution using 10-mL of $H_2O$ and Sampled (Sample #2).

(b) concentrating the solution to leave solution and solids;

(c) contacting the solution and solids with a solution of at least 68-wt % nitric acid, whereby Cs-131 is dissolved in the acid solution and barium is precipitated as a solid; and (d) separating the solids of step (c) from the acid solution containing the Cs-131, thereby purifying the Cs-131.

2. The method according to claim 1 wherein the concentration of the nitric acid in step (c) is 85-90-wt %.

3. The method according to claim 1 wherein the concentration of the nitric acid in step (c) is at least 90-wt %.

4. The method according to claim 1 wherein the acid in step (a) is nitric acid.

5. The method according to claim 1 whereby steps (c) and (d) are repeated with the solids of step (d) and the acid solution from each step (d) is combined.

6. The method according to claim 1 whereby the acid solution of step (d) is evaporated to incipient dryness and steps (c) and (d) are repeated.

7. The method according to claim 1 wherein the solids of step (d) are subjected to the steps of:

(i) storing the solids to allow additional Cs-131 to form from decay of barium;

(ii) dissolving the solids in a solution comprising water, with heat; and (iii) repeating steps (b), (c) and (d) of claim 1.

8. The method according to any one of claims 1-7 having additional step (e), comprising contacting the acid solution

TABLE 3

Analytical Laboratory Results

Starting Targets: E, D, C, B, and A; 887 g $BaCO_3$; Est. Total Cs-131 Activity, 3,700 mCi; (1) Est. Total Ba-131 Activity, 8,150 mCi. (1)

| Sample ID | Initial #0 | Step #12 Sample #1 | FINAL PRODUCT Sample #2 | Decontamination Factor | | |
|---|---|---|---|---|---|---|
| Isotope | milliCuries | milliCuries | milliCuries | #0/#1 | #1/#2 | #0/#2 |
| Cs-131 | 3,700 est. | 3,370 | 3,260 | 1.1 | 1.03 | 1.13 |
| Ba-131 | 8,150 | 0.910 | <0.005 | 8,900 | 182 | >1.6E6 |
| La-140 | | 2.14 | <0.0006 | — | >1.1E4 | |
| Co-60 | | 0.0162 | <0.0002 | — | >81 | |
| Au-198 | | 0.0085 | <0.0003 | — | >28 | |
| Other isotopes (2) | | — | — | — | — | |

(1) Estimated based on reactor performance.
(2) Other isotopes of interest, e.g., Zn-65, Sb-124, and Cs-137, were below the analytical detection limit.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention.

The invention claimed is:

1. A method for purifying Cs-131, comprising the steps of:

(a) dissolving neutron-irradiated barium comprising barium and Cs-131, in a solution comprising an acid;

containing the Cs-131 with a resin that removes barium, thereby removing trace barium if present from the Cs-131.

9. The method according to any one of claims 1-7 having additional steps (e) and (f), comprising (e) evaporating the solution containing the purified Cs-131 to incipient dryness; and (f) dissolving the purified Cs-131 with a solution of choice.

10. The method according to claim 8 having additional steps (f) and (g), comprising (f) evaporating the solution containing the purified Cs-131 to incipient dryness; and (g) dissolving the purified Cs-131 with a solution of choice.

11. The method according to any one of claims 1-7 having additional step (e), comprising removing La-140 and Co-60 from the acid solution containing Cs-131.

12. The method according to claim 11 having additional steps (f) and (g), comprising (f) evaporating the solution containing the purified Cs-131 to incipient dryness; and (g) dissolving the purified Cs-131 with a solution of choice.

13. The method according to claim 8 having additional step (f), comprising removing La-140 and Co-60 from the acid solution containing Cs-131.

14. The method according to claim 13 having additional steps (g) and (h), comprising (g) evaporating the solution containing the purified Cs-131 to incipient dryness; and (h) dissolving the purified Cs-131 with a solution of choice.

* * * * *